(12) United States Patent
Phillips

(10) Patent No.: US 6,257,260 B1
(45) Date of Patent: Jul. 10, 2001

(54) RETRACTABLE CANVAS FOR A TRUCK BED

(76) Inventor: Joseph A. Phillips, P.O. Box 4224, Wichita, KS (US) 67204

( * ) Notice: Subject to any disclaimer, the term of this patent is extended or adjusted under 35 U.S.C. 154(b) by 0 days.

(21) Appl. No.: 09/226,255

(22) Filed: Jan. 7, 1999

(51) Int. Cl.[7] .......................... E04H 15/06; B62D 25/06
(52) U.S. Cl. .................... 135/88.13; 135/88.11; 135/129; 135/131; 296/100.18; 296/105
(58) Field of Search ............. 135/88.01, 88.07, 135/88.11, 88.13, 129, 130–131, 124, 88.15, 88.16; 296/100.01, 105, 100.12, 100.18, 106, 163, 165

(56) References Cited

U.S. PATENT DOCUMENTS

| | | | |
|---|---|---|---|
| D. 273,670 | * | 5/1984 | Keil ...................................... D12/156 |
| D. 311,165 | * | 10/1990 | Moore ................................. D12/156 |
| 3,064,667 | * | 11/1962 | Marino ................................. 135/131 |
| 3,688,787 | * | 9/1972 | Feather ................................ 135/129 |
| 3,874,721 | * | 4/1975 | Tuggle ................................. 296/105 |
| 3,901,548 | * | 8/1975 | Seaman, Jr. .......................... 296/105 |
| 3,970,096 | * | 7/1976 | Nicolai ............................. 135/906 X |
| 4,289,346 | * | 9/1981 | Bourgeois ........................... 296/105 |
| 4,709,956 | * | 12/1987 | Bowman .......................... 296/163 X |
| 4,721,336 | * | 1/1988 | Reed ................................... 296/165 |
| 4,756,325 | * | 7/1988 | Daniels ............................. 135/88.01 |
| 4,938,523 | * | 7/1990 | Camp .............................. 296/105 X |
| 5,005,896 | * | 4/1991 | Li .................................... 135/129 X |
| 5,377,712 | * | 1/1995 | Lung-Sheng ...................... 135/88.13 |

* cited by examiner

Primary Examiner—Carl D. Friedman
Assistant Examiner—Winnie Yip

(57) ABSTRACT

A retractable truck canvas is provided for use with a truck having a cab and a bed defined by a bottom with a peripheral side wall coupled to a periphery of the bottom and extending upwardly therefrom for forming an interior space and an upper peripheral edge. Also included is a retractable frame assembly having a plurality of inverted U-shaped members each including a horizontally oriented upper portion and a pair of a vertically oriented side portions. Each vertically oriented side portion has a lower end that is slidably coupled to a side extent of the upper peripheral edge of the bed of the truck. Next provided is a canvas mounted on the inverted U-shaped members of the frame assembly.

1 Claim, 3 Drawing Sheets

RETRACTABLE CANVAS FOR A TRUCK BED

BACKGROUND OF THE INVENTION

1. Field of the Invention

The present invention relates to truck bed covers and more particularly pertains to a new retractable canvas for a truck bed for conveniently deploying and retracting a canvas which protects cargo within a truck bed.

2. Description of the Prior Art

The use of truck bed covers is known in the prior art. More specifically, truck bed covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art truck bed covers include U.S. Pat. No. 4,289,346; U.S. Pat. No. 4,285,539; U.S. Pat. No. Des. 311,165; U.S. Pat. No. 3,901,548; U.S. Pat. No. 4,756,325; and U.S. Pat. No. Des. 273,670.

In these respects, the retractable canvas for a truck bed according to the present invention substantially departs from the conventional concepts and designs of the prior art, and in so doing provides an apparatus primarily developed for the purpose of conveniently deploying and retracting a canvas which protects cargo within a truck bed.

SUMMARY OF THE INVENTION

In view of the foregoing disadvantages inherent in the known types of truck bed covers now present in the prior art, the present _invention provides a new retractable canvas for a truck bed construction wherein the same can be utilized for conveniently deploying and retracting a canvas which protects cargo within a truck bed.

The general purpose of the present invention, which will be described subsequently in greater detail, is to provide a new retractable canvas for a truck bed apparatus and method which has many of the advantages of the truck bed covers mentioned heretofore and many novel features that result in a new retractable canvas for a truck bed which is not anticipated, rendered obvious, suggested, or even implied by any of the prior art truck bed covers, either alone or in any combination thereof.

To attain this, the present invention is adapted for use with a truck having a cab and a bed defined by a bottom with a peripheral side wall coupled to a periphery of the bottom and extending upwardly therefrom. As such, an interior space and an upper peripheral edge is defined. The present invention includes a pair of mounting channels each having a bottom face mounted along a side extent of the upper peripheral edge of the truck bed of the truck. A air of side walls are coupled to and extend upwardly from the bottom face. Each of such side walls of the mounting channels is equipped with an inwardly extending flange formed along an upper edge thereof for defining a slot. For reasons that will soon become apparent, an outboard one of the inwardly extending flanges of each mounting channel has a plurality of equally spaced snap fasteners mounted thereon. Further, each of the side walls of each mounting channel has a plurality of equally spaced apertures formed therein. Next provided is a retractable frame assembly including a plurality of inverted U-shaped members. Each of such members has a horizontally oriented upper portion and a pair of a vertically oriented side portions. Each side portion of each inverted U-shaped member has a lower end with a horizontally oriented cylindrical roller mounted thereon for being slidably situated within the slot of one of the mounting channels. The retractable frame further includes a plurality of retractors mounted between the side portions of each inverted U-shaped member. As shown in FIG. 2, each retractor includes a pair of stationary hinges fixedly mounted on upper ends of the side portions of adjacent inverted U-shaped members. A pair of sliding hinges are slidably coupled adjacent lower ends of the side portions of the adjacent inverted U-shaped members. Finally, a pair of linear interconnects are each pivotally coupled with respect to each other at a central extent thereof. Further, such interconnects are hingably coupled between the stationary hinges and the sliding hinges. By this structure, the frame assembly may be retracted or extended per the desires of the user. Mounted on an outer surface of the inverted U-shape members of the retractable frame assembly is a water-resistant canvas. Such canvas is equipped with a pair of lower side edges each having a plurality of equally spaced snap fasteners. These snap fasteners are adapted for being releasably coupled to the snap fasteners of the mounting channels. As shown in FIG. 6, the water resistant canvas further includes a pair of transparent panels. The transparent panels are equipped with upper and side edges coupled to the upper portions and side portions of a frontmost and a rearmost one of the inverted U-shaped members of the retractable frame assembly. Ideally, the rearmost transparent panel is openable by way of a peripheral zipper. As shown in FIG. 4, a plurality of pins serve for being removably inserted within the apertures of the mounting channels. In use, the pins are adapted for fixing the id inverted U-shaped members in place. Finally, a Y-shaped pull strap is provided having a pair of upper ends mounted to the upper portion of the rearmost inverted U-shaped member of the retractable frame assembly. In use, the Y-shaped pull strap is adapted for allowing a user to extend the retractable frame assembly by pulling a lower end thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable canvas for a truck bed apparatus and method which has many of the advantages of the truck bed covers mentioned heretofore and many novel features that result in a new retractable canvas for a truck bed which is not anticipated, rendered obvious, suggested, or even implied by any of the prior art truck bed covers, either alone or in any combination thereof.

It is another object of the present invention to provide a new retractable canvas for a truck bed which may be easily and efficiently manufactured and marketed.

It is a further object of the present invention to provide a new retractable canvas for a truck bed which is of a durable and reliable construction.

An even further object of the present invention is to provide a new retractable canvas for a truck bed which is susceptible of a low cost of manufacture with regard to both materials and labor, and which accordingly is then susceptible of low prices of sale to the consuming public, thereby making such retractable canvas for a truck bed economically available to the buying public.

Still yet another object of the present invention is to provide a new retractable canvas for a truck bed which provides in the apparatuses and methods of the prior art some of the advantages thereof, while simultaneously overcoming some of the disadvantages normally associated therewith.

Still another object of the present invention is to provide a new retractable canvas for a truck bed for conveniently deploying and retracting a canvas which protects cargo within a truck bed.

Even still another object of the present invention is to provide a new retractable canvas for a truck bed that is adapted for use with a truck having a cab and a bed defined by a bottom with a peripheral side wall coupled to a periphery of the bottom and extending upwardly therefrom for forming an interior space and an upper peripheral edge. Also included is a retractable frame assembly having a plurality of inverted U-shaped members each including a horizontally oriented upper portion and a pair of a vertically oriented side portions. Each vertically oriented side portion has a lower end that is slidably coupled to a side extent of the upper peripheral edge of the bed of the truck. Next provided is a canvas mounted on the inverted U-shaped members of the frame assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
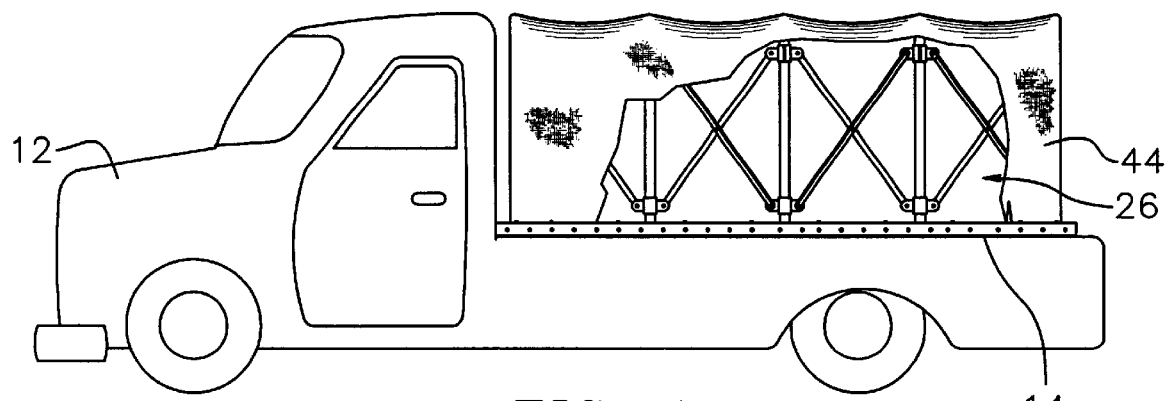
FIG. 1 is a side view of a new retractable canvas for a truck bed according to the present invention.

With reference now to the drawings, and in particular to FIGS. 1 through 6 thereof, a new retractable canvas for a truck bed embodying the principles and concepts of the present invention and generally designated by the reference numeral 10 will be described.

The present invention, designated as numeral 10, is adapted for use with a truck 12 having a cab and a bed. Such bed is defined by a bottom with a peripheral side wall coupled to a periphery of the bottom and extending upwardly therefrom. As such, an interior space and an upper peripheral edge are defined.

The present invention includes a pair of mounting channels 14 each having a bottom face 16 mounted along a side extent of the upper peripheral edge of the bed of the truck. While not shown, it should be noted that the bottom face 16 has an arcuate lower surface for conforming to the curvature of the upper peripheral edge of the bed of the truck. A pair of side walls 18 are coupled to and extend upwardly from the bottom face. Each of such side walls of the mounting channels is equipped with an inwardly extending flange 20 formed along an upper edge thereof for defining a slot. For reasons that will soon become apparent, an outboard one of the inwardly extending flanges of each mounting channel has a plurality of equally spaced snap fasteners 22 mounted thereon. Further, each of the side walls of each mounting channel has a plurality of equally spaced, aligned apertures 24 formed therein.

Next provided is a retractable frame assembly 26 including a plurality of inverted U-shaped members 28. Each of such members has a horizontally oriented upper portion 30 and a pair of a vertically oriented side portions 32. Each side portion of each inverted U-shaped member has a lower end with a horizontally oriented cylindrical roller 34 mounted thereon for being slidably situated within the slot of one of the mounting channels. Gaskets preferably line an upper surface of the mounting channels for preventing water from entering the slot.

Figure 2:
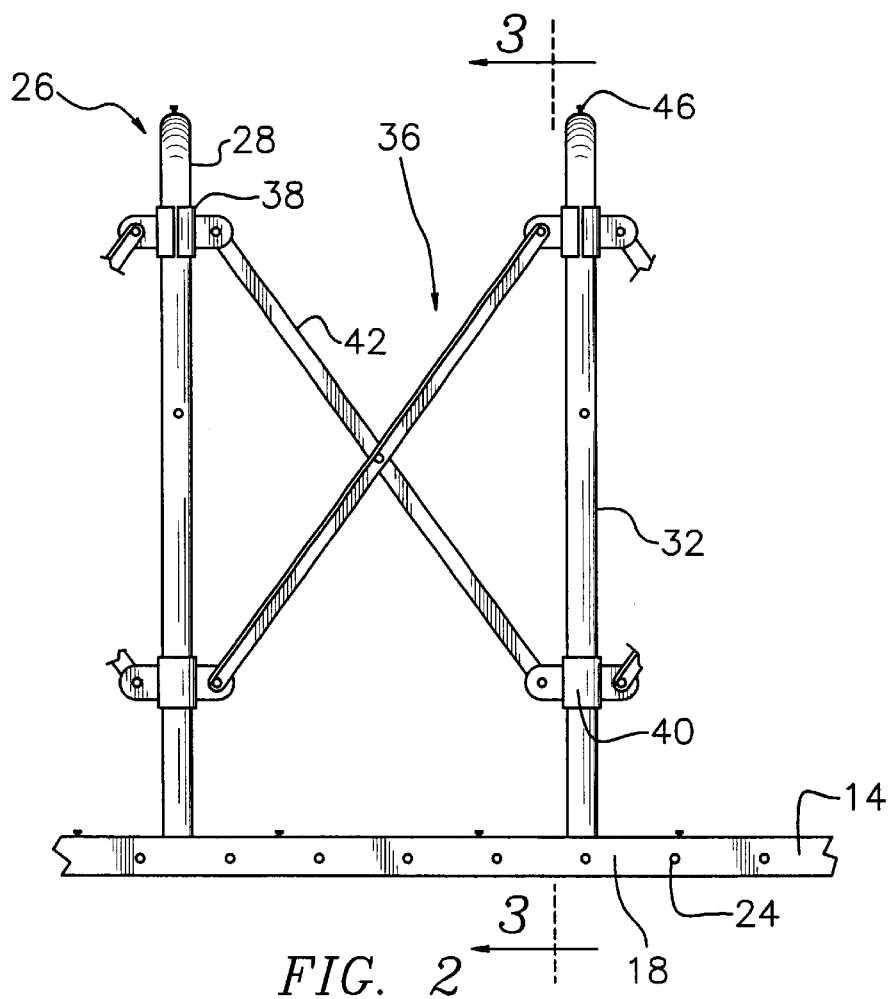
FIG. 2 is a detailed side view of the one of the retractors of the frame assembly of the present invention.
Figure 3:
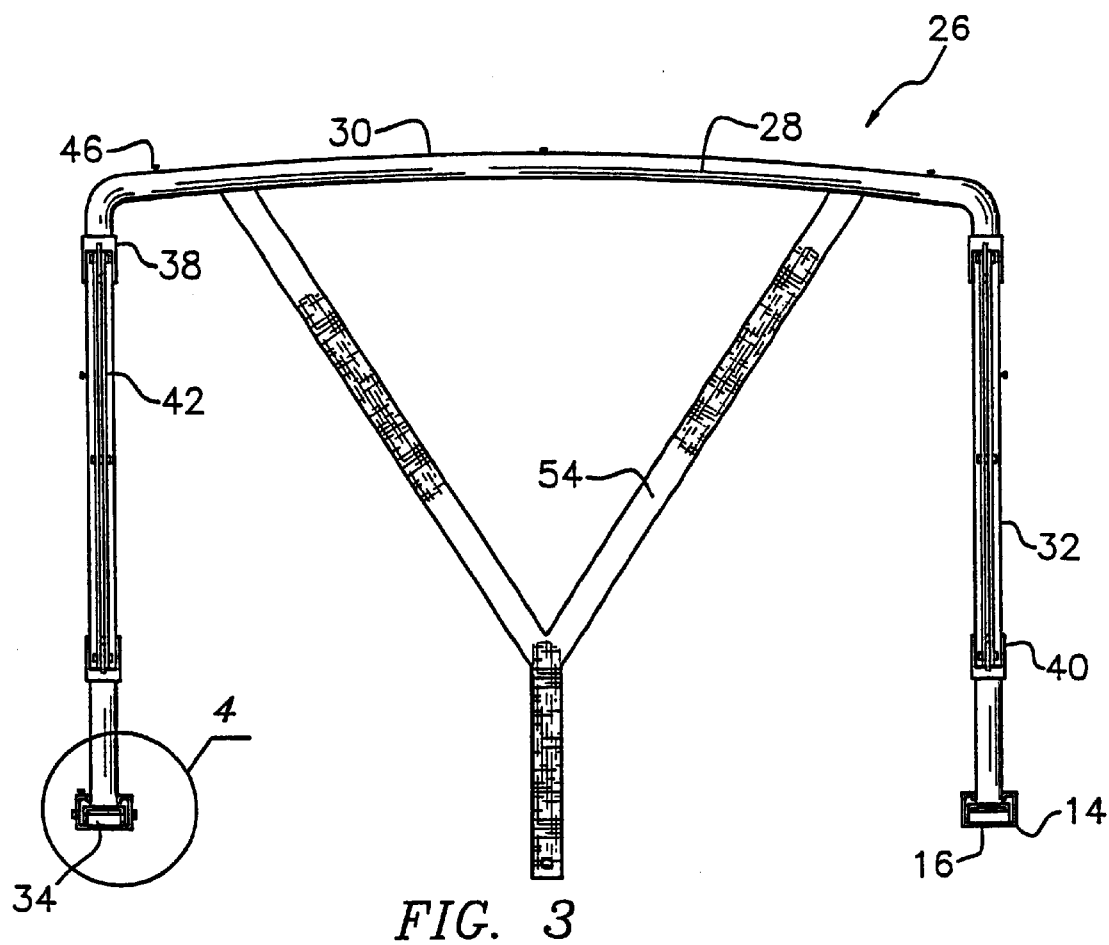
FIG. 3 is a rear view of the present invention showing the Y-shaped pull strap thereof.

The retractable frame further includes a plurality of retractors 36 mounted between the side portions of each inverted U-shaped member. As shown in FIG. 2, each retractor includes a pair of stationary hinges 38 fixedly mounted on upper ends of the side portions of adjacent inverted U-shaped members. A pair of sliding hinges 40 are slidably coupled adjacent lower ends of the side portions of the adjacent inverted U-shaped members. Finally, a pair of linear interconnects 42 are each pivotally coupled with respect to each other at a central extent thereof. Further, such interconnects are hingably coupled between the stationary hinges and the sliding hinges. By this structure, the frame assembly may be retracted or extended per the desires of the user. In the preferred embodiment, each interconnect has an L-shape cross-section along a length thereof for strengthening purposes.

Figure 6:
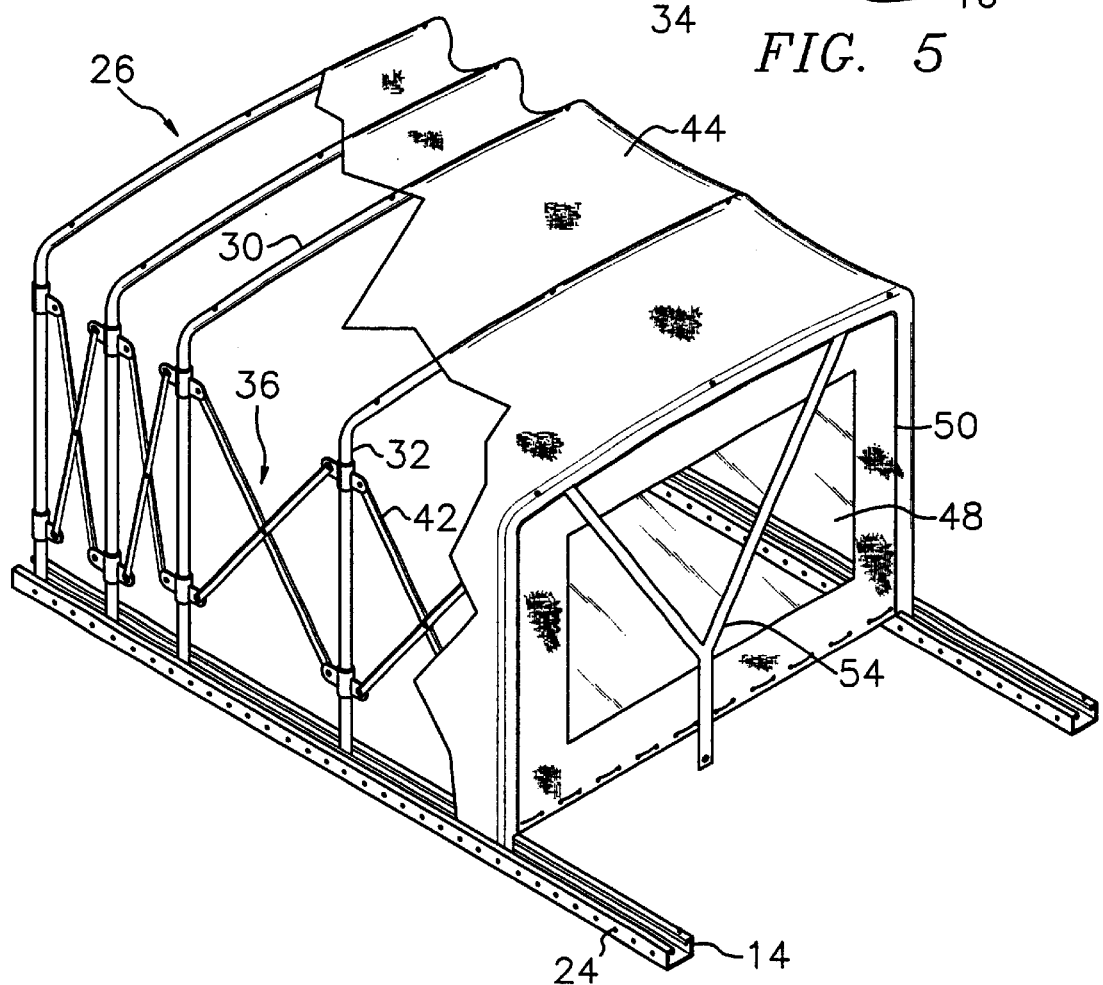
FIG. 6 is a perspective view of the present invention showing the transparent panels of the canvas.

Mounted on an outer surface of the inverted U-shape members of the retractable frame assembly is a water-resistant canvas 44. Such coupling is preferably accomplish with snap fasteners 46, pile fasteners, button fasteners or any other type of fasteners mounted along an inner surface of the canvas and outer surface of the inverted U-shaped members. Such canvas is equipped with a pair of lower side edges each having a plurality of equally spaced snap fasteners or any other type of fastener, as set forth hereinabove. These snap fasteners are adapted for being releasably coupled to the snap fasteners of the mounting channels. As shown in FIG. 6, the water resistant canvas further includes a pair of transparent panels 48. The transparent panels are equipped with upper and side edges coupled to the upper portions and side portions of a frontmost and a rearmost one of the inverted U-shaped members of the retractable frame assembly. Ideally, the rearmost transparent panel is openable by way of a peripheral zipper 50.

Figure 4:
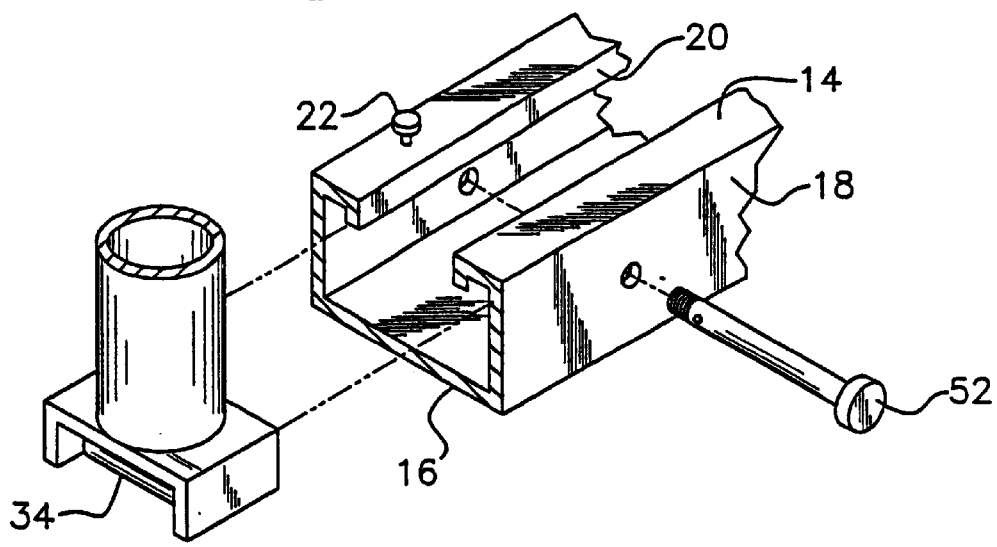
FIG. 4 is an exploded perspective view of one of the mounting channels of the present invention.
Figure 5:
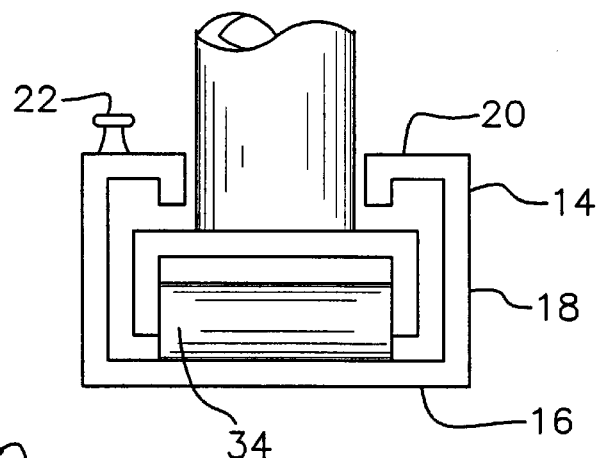
FIG. 5 is side cross-sectional view of one of the mounting channels of the present invention with a roller of the frame assembly situated therein.

As shown in FIG. 4, a plurality of pins 52 serve for being removably inserted within the apertures of the mounting channels. In use, the pins are adapted for fixing the inverted U-shaped members in place. The pins are preferably equipped with a lock clip or pin to prevent the inadvertent removal thereof.

Finally, a Y-shaped pull strap 54 is provided having a pair of upper ends mounted to the upper portion of the rearmost inverted U-shaped member of the retractable frame assembly. In use, the Y-shaped pull strap is adapted for allowing a user to extend the retractable frame assembly by pulling a lower end thereof. Ideally, the lower end of the Y-shaped pull strap is snappily or otherwise coupled to a lower edge of the rearmost transparent panel when not in use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable truck canvas comprising, in combination:

a truck including a cab and a bed defined by a bottom with a peripheral side wall coupled to a periphery of the bottom and extending upwardly therefrom for defining an interior space and an upper peripheral edge;

a pair of mounting channels each having a bottom wall mounted along a side extent ot the upper peripheral edge of the truck bed of the truck, the bottom wall having an upper surface, a pair of side walls coupled to and extending upwardly from the bottom wall each with side wall having an inwardly extending flange formed along an upper edge thereof for defining a slot, an outboard one of the inwardly extending flanges of each mounting channel having a plurality of equally spaced snap fasteners mounted thereon and each of the side walls of each mounting channel having a plurality of equally spaced apertures formed therein;

a retractable frame assembly including a plurality of inverted U-shaped members each having a horizontally oriented upper portion and a pair of a vertically oriented side portions each having a lower end with a horizontally oriented cylindrical roller mounted thereon for being slidably situated within the slot of one of the mounting channels, the retractable frame further including a plurality of retractors mounted between the side portions of each inverted U-shaped member, each retractor including a pair of stationary hinges fixedly mounted on upper end of the side portions of adjacent inverted U shaped members, a pair of sliding hinges slidably coupled adjacent lower ends of the side portions of the adjacent inverted U-shaped members, and a pair of linear interconnects each pivotally coupled with respect to each other at a central extent thereof and further hingably coupled between the stationary hinges and the eliding hinges;

a water-resistant canvas mounted on an outer surface of the inverted U-shaped members of the retractable frame assembly, the water resistant; canvas further including a pair of transparent panels with upper and side edges coupled to the upper portions and side portions of it frontmost and a rearmost one of the inverted U-shaped members of the retractable frame assembly;

a plurality of pins for being removably inserted within the apertures of the mounting channels for fixing the inverted shaped members in place;

a Y-shaped pull strap having a pair of upper ends mounted to the upper portion of the rearmost inverted U-shaped member of the retractable frame assembly for allowing a user to extend the retractable frame assembly by pulling lower end thereof; and wherein each of the flanges has a retaining member downwardly extending from an end opposite the respective sidle wall for maintaining contact between the roller and the upper surface of the base wall to resist tilting of the inverted U-shaped members with respect to the mounting channel.

* * * * *